No. 678,874. Patented July 23, 1901.
J. A. HEANY.
ELECTRIC MOTOR.
(Application filed Nov. 19, 1900.)
(No Model.) 2 Sheets—Sheet 1.
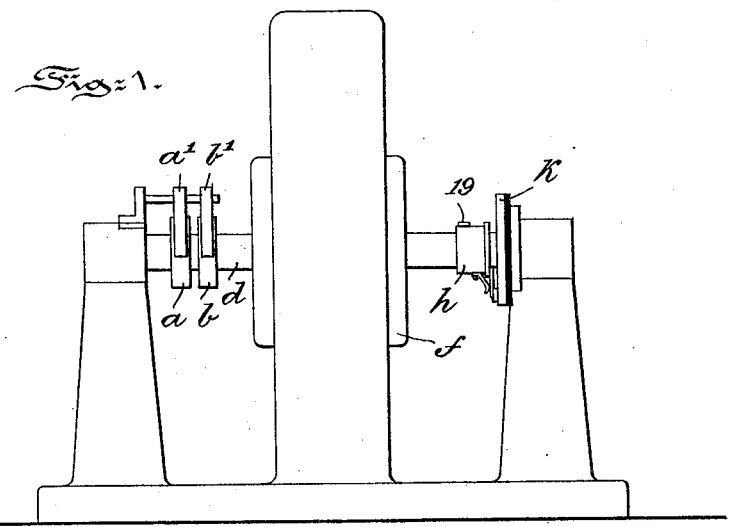
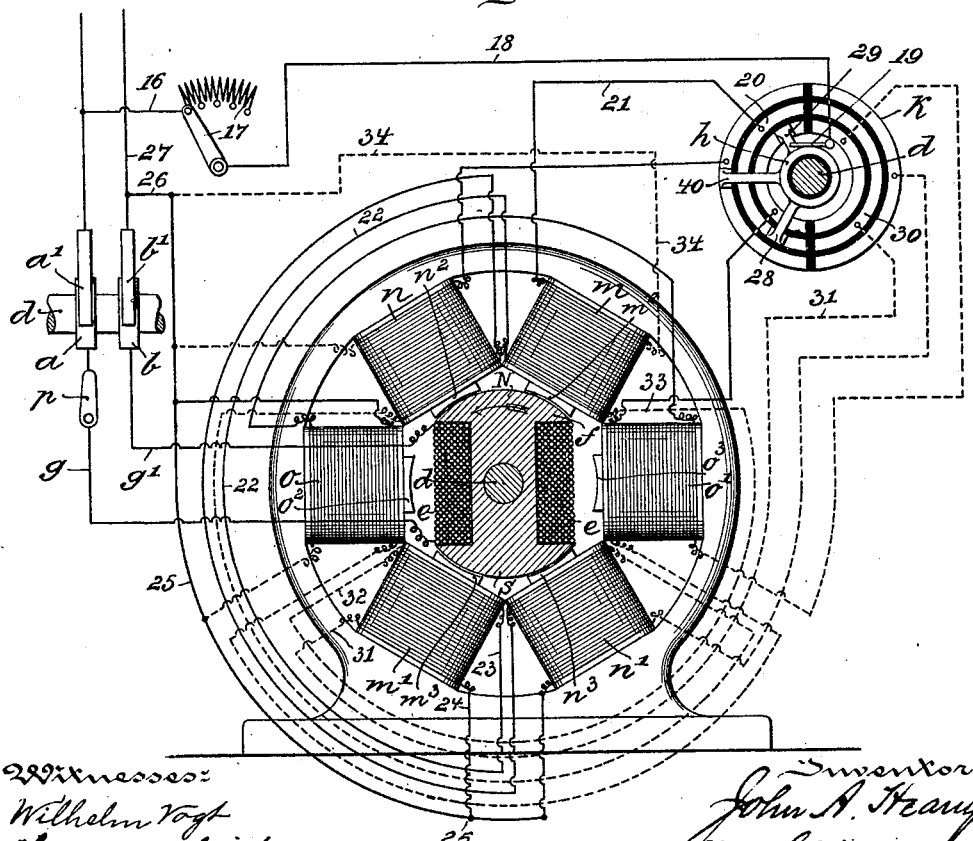
Witnesses:
Wilhelm Vogt
Thomas M. Smith
Inventor:
John A. Heany
By J. Walter Douglas
Attorney No. 678,874. Patented July 23, 1901.
J. A. HEANY.
ELECTRIC MOTOR.
(Application filed Nov. 19, 1900.)
(No Model.) 2 Sheets—Sheet 2.
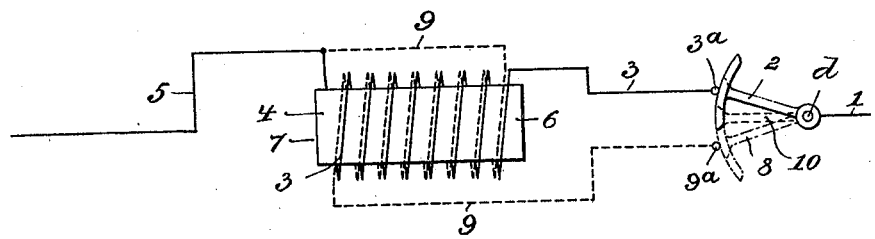
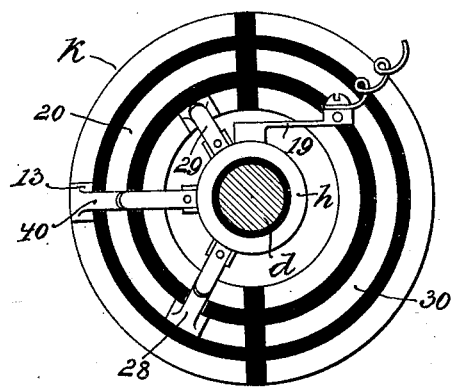
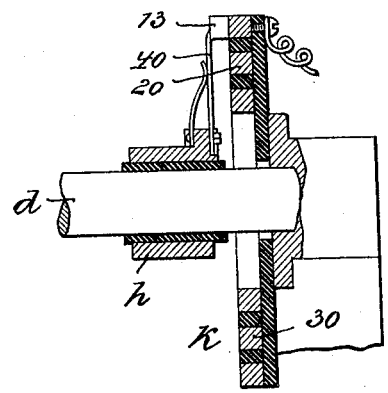
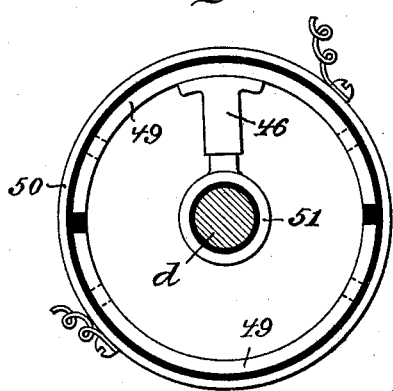
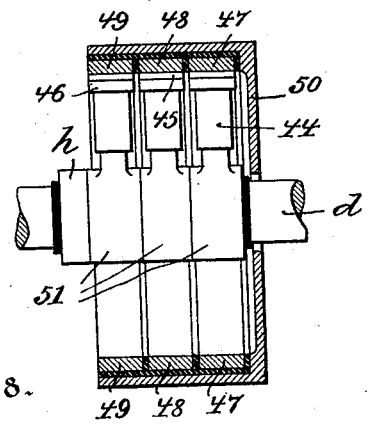
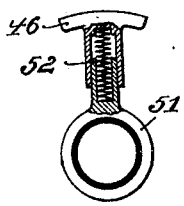

UNITED STATES PATENT OFFICE.

JOHN A. HEANY, OF PHILADELPHIA, PENNSYLVANIA, ASSIGNOR TO THE TETER-HEANY DEVELOPING COMPANY, OF SAME PLACE AND CHARLESTON, WEST VIRGINIA.

ELECTRIC MOTOR.

SPECIFICATION forming part of Letters Patent No. 678,874, dated July 23, 1901.

Application filed November 19, 1900. Serial No. 36,959. (No model.)

*To all whom it may concern:*

Be it known that I, JOHN A. HEANY, a citizen of the United States, residing at the city of Philadelphia, in the county of Philadelphia and State of Pennsylvania, have invented certain new and useful Improvements in Electric Motors, of which the following is a specification.

My invention has relation to an electric motor, and in such connection it relates to the construction and arrangement of parts constituting such a motor.

The principal objects of my invention are, first, to provide an electric motor which may be operated by direct current; second, to provide an electric motor which may be operated with proper efficiency at either high or low speed; third, to provide an electric motor which will not burn out when the full load is thrown upon it at starting; fourth, to provide an electric motor in which all parts are at all times doing work, thereby relieving the motor of undue strain upon special parts; fifth, to provide an electric motor wherein the wire windings are simple and reduced to a minimum in quantity and weight, and, sixth, to provide a motor in which the armature and field are supplied directly from the main current. In the attainment of these objects the motor is constructed and arranged in substantially the manner hereinafter described and claimed.

The nature and scope of my invention will be more fully understood from the following description, taken in connection with the accompanying drawings, forming part hereof, in which—

Figure 1 is a front elevational view of an electric motor embodying main features of my invention. Fig. 2 is a diagrammatic view illustrating the various parts comprising the motor and its commutator and also illustrating the various circuits. Fig. 3 is a diagrammatic view illustrating the winding of one of the field-magnets. Fig. 4 is a face view, enlarged, of a disk and contacts for commutating the field-magnets. Fig. 5 is a vertical sectional view of Fig. 4. Fig. 6 is a face view, enlarged, of a modified form of commutator. Fig. 7 is a vertical sectional view of Fig. 6, and Fig. 8 is a detail view of one of the contact-arms of Figs. 6 and 7.

Referring to the drawings, $a$ and $b$, Figs. 1 and 2, are two collector-rings situated upon the main shaft $d$ of the motor. On the ring $a$ is located a contact-piece $a'$, forming the positive terminal of the current and connected in the main circuit. From the ring $a$ the current passes to the coil $e$ of the armature $f$ by the wire $g$ and returns from the coil $e$ to the ring $b$ by wire $g'$. On the ring $b$ rests the contact $b'$, forming the negative terminal of the main circuit. The armature $f$ is of simple form, in which the flow of current never changes, and consequently its opposite poles are uniformly north, or positive, and south, or negative. The field-magnets $m, n,$ and $o$ are arranged in the usual manner around the armature, and each magnet is divided into two sections $m$ and $m'$, $n$ and $n'$, and $o$ and $o'$, arranged diametrically opposite to each other and of opposite polarity. Thus if the section $m$ is of positive polarity then the complemental section $m'$ is of opposite polarity, and vice versa. The windings of these magnets are illustrated in diagram in Fig. 3. Upon the core 4 is wound in one direction the wire 3, (illustrated in full lines,) and in the opposite direction is wound the wire 9, as illustrated in dotted lines. The wires 3 and 9 terminate at one end in two terminals $3^a$ and $9^a$, respectively, and at the other end in a common wire or return 5. In conjunction with this winding a contact-piece 2 is provided, which is connected with a branch 1 of the main circuit and is adapted to rest upon either terminal $3^a$ or $9^a$ or upon both terminals. When, for instance, the piece 2 rests only on the terminal $3^a$, the current from the wire 1 passes through the coil 3, and the core 4 at the end 6 is of north polarity and at the end 7 is of south polarity. When, however, the piece is moved to the position indicated by the dotted lines 8, so as to rest only on the terminal $9^a$, the flow of current through the coil 9 reverses the polarity of the core 4. If, however, the piece 2 is moved to the position illustrated by the dotted lines 10, then the core 4 is neutral.

Returning now to Fig. 2, the field-magnets $m$, $n$, and $o$ are all wound as indicated in Fig. 3, and if, for instance, the sections $m$ and $m'$ be first considered it will be found that the current is taken off from one branch 16 of the main circuit through a rheostat 17 by the wire 18 to a contact-piece 19, resting upon a contact-sleeve $h$, secured to and rotating with the shaft $d$ of the motor. Adjacent to the sleeve $h$ is arranged in the commutator (illustrated in Figs. 1 to 5, inclusive) a disk $k$, made up of three concentric rings, each divided by insulation into two segments and all separated from each other by insulating material. On the sleeve $h$ is secured three contact arms or fingers 28, 29, and 40, of different lengths and adapted, respectively, to travel over the segments of each ring. The fingers each have a contact-block 13, of a width greater than the width of the insulating material separating the two segments of any one ring. If now the intermediate ring of the disk $k$, which controls the current entering the magnet $m$ $m'$, be considered, it will be found to be divided by insulating material into two segments 20 and 30, respectively. The segment 20 is connected by wire 21 with the section $m$ of the magnet, which is wound to give a positive polarity to its pole-piece $m^2$ when the current passes through the wire 21. The wire 21 leaves the magnet-section $m$ in a continuation 22 and 23, which extends to the section $m'$ and wound thereon to give to its pole-piece $m^3$ a negative polarity. The wire leaves the section $m'$, as indicated at 24, and extends by the wires 25, 26, and 27 to the other branch of the main circuit. From the segment 30 a wire 31 extends to the magnet $m'$, around the core of which it is wound in a direction opposite to that in which the wire 23 was wound, and then leaves the magnet by wire 32, extending to the magnet $m$, which it enters, as at 33, and is there wound around the core in a direction opposite to that in which the wire 21 was wound and emerges in wire 34, which extends to the return 27 of the main circuit. If now the contact-arm 28, carried by the sleeve $h$, rests upon the segment 20, then the current will flow through wire 21 of the magnet $m$ to give its pole $m^2$ a positive polarity and also through the wire 23 of the magnet $m'$ to give the pole $m^3$ a negative polarity. If now the N and S poles of the armature $f$ be arranged as indicated in Fig. 2, it follows that the pole $m^2$ of the magnet $m$ will repel the N pole of the armature, and the pole $m^3$ of the magnet $m'$ will repel the S pole of the armature, and the armature will rotate in the direction of the arrow.

The arrangement of the various segments and the contact pieces or fingers 28, 29, and 40 is such that the polarity of the pole-pieces of the magnets $m$, $n$, and $o$ and $m'$, $n'$, and $o'$ are changed as the armature rotates, so as to always present the same polarity as the pole of the armature adjacent to the pole-piece. Again, before the polarity of the magnets is reversed—as, for instance, before the finger 28 rests wholly on the segment 30 to cause the current to flow through the dotted wires to reverse the polarity of the poles $m^2$ and $m^3$— the block 13 of the finger 28 will bridge the insulation between the segments and will connect both segments with the sleeve $h$. In this position two currents of equal strength will flow through each magnet $m$ and $m'$ in opposite directions, and hence the poles $m^2$ and $m^3$ will be neutral. When the poles $m^2$ and $m^3$ are so neutralized, the poles of the armature $f$ will be neither attracted nor repelled. It will thus be seen that the armature $f$ is subjected to the influence of currents in the magnets $m$, $n$, and $o$, which are alternately reversed and neutralized, so that the poles $m^2$ and $m^3$, $n^2$ and $n^3$, and $o^2$ and $o^3$, adjacent to the poles of the armature, are either repelling said poles or are neutral with respect to the same.

In Figs. 1, 2, 4, and 5 the commutator $k$ is shown in disk form. It may, however, be constructed as illustrated in Figs. 6, 7, and 8, wherein the rings 47, 48, and 49 are arranged side by side and divided into segments, as before explained. These rings are located within a cup or sleeve 50, and this cup is traversed by the shaft $d$ of the motor. On the shaft $d$ is a series of sleeves 51 in electrical connection with the positive wire of the main circuit. From each sleeve 51 projects a shoe 44, 45, and 46, adapted to slide on and contact with the respective segmental rings 47, 48, and 49. The shoes 44, 45, and 46 may be pressed tightly upon the respective rings by means of a spring 52, as illustrated in Fig. 8.

One feature of especial advantage to be found in the construction of motor heretofore described is the facility with which the armature may be checked in speed or completely stopped. This is due to the fact that the current is led directly to the armature as well as directly to the field-magnets by separate branch circuits. By locating a switch $p$ in the line $g$, as illustrated in Fig. 2, the current to the armature may be cut off or turned on at will, and when cut off the armature under the influence of the field-magnets will be almost instantly stopped. Again, by manipulating the rheostat 17 the current through line 18, and consequently through the field-magnets, may be increased and decreased in intensity to vary the speed of the motor. When the rheostat is operated to completely break the current in line 18, the armature will almost instantly come to rest.

Having thus described the nature and objects of my invention, what I claim as new, and desire to secure by Letters Patent, is—

1. In an electric motor, a series of field-magnets each divided into two sections or poles, each field-magnet section having two windings oppositely arranged and a commutator adapted to connect either winding or both windings with the main circuit, substantially as and for the purposes described.

2. In an electric motor, a field-magnet having its core wound with two oppositely-arranged windings, a main circuit and a contact-piece adapted to connect either or both of the windings with the main circuit, substantially as and for the purposes described.

3. In an electric motor, a simply-wound armature having its poles constant, a series of field-magnets surrounding the armature and each magnet having its poles separated and diametrically disposed, a double winding for each pole, said windings being oppositely disposed, and a commutator rotating with the armature and adapted to commutate the current supplied to the motor through either or both windings, substantially as and for the purposes described.

4. In an electric motor, a main circuit, a series of field-magnets, an armature surrounded by said field-magnets, a branch of the main circuit leading directly to the armature, a second branch of the main circuit leading to a commutator controlling the field-magnets, and means for making and breaking either branch circuit to bring the armature to rest, substantially as and for the purposes described.

In testimony whereof I have hereunto set my signature in the presence of two subscribing witnesses.

JOHN A. HEANY.

Witnesses:
J. WALTER DOUGLASS,
THOMAS M. SMITH.